United States Patent
Nakagawa et al.

(10) Patent No.: US 10,393,253 B2
(45) Date of Patent: Aug. 27, 2019

(54) TRANSMISSION CASE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Hideki Nakagawa, Toyota (JP); Kozo Yamamoto, Nagoya (JP); Hirofumi Nakada, Toyota (JP); Haruki Shirasaka, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/414,093

(22) Filed: Jan. 24, 2017

(65) Prior Publication Data

US 2017/0211681 A1 Jul. 27, 2017

(30) Foreign Application Priority Data

Jan. 25, 2016 (JP) ................................ 2016-011418

(51) Int. Cl.
*F16H 57/021* (2012.01)
*F16H 57/03* (2012.01)

(52) U.S. Cl.
CPC ............ *F16H 57/021* (2013.01); *F16H 57/03* (2013.01)

(58) Field of Classification Search
CPC ................................ F16H 57/03; F16H 57/021
See application file for complete search history.

(56) References Cited

U.S. PATENT DOCUMENTS

2013/0104682 A1* 5/2013 Schneider .................. F16H 1/20
74/421 A
2013/0123053 A1* 5/2013 Haupt .................. F16H 57/0441
474/91

FOREIGN PATENT DOCUMENTS

JP 2002-349667 A 12/2002
JP 2015-218900 A 12/2015
WO WO-2015151609 A1 * 10/2015 ............. F16H 57/03

OTHER PUBLICATIONS

Machine Translation of WO 2015/151609, obtained Jan. 25, 2018.*

* cited by examiner

*Primary Examiner* — Richard W Ridley
*Assistant Examiner* — Brian J McGovern
(74) *Attorney, Agent, or Firm* — Oliff PLC

(57) ABSTRACT

A transmission case include: a wall portion; a bearing portion having a through-hole penetrating through the wall portion such that a power transmission shaft is inserted into the through-hole, the bearing portion projecting from the wall portion in a cylindrical shape; and a rib projected from the wall portion in the same direction as a projection direction of the bearing portion, the rib having an arc portion. When viewed from a direction along the center line of the bearing portion, the wall portion includes i) a first wall portion in a region surrounded by the bearing portion, the arc portion of the rib and two common tangent lines to the bearing portion and the arc portion of the rib, and ii) a second wall portion in another region; and the first wall portion is offset in the projection direction of the bearing portion relative to the second wall portion.

5 Claims, 3 Drawing Sheets

TRANSMISSION CASE

INCORPORATION BY REFERENCE

The disclosure of Japanese Patent Application No. 2016-011418 filed on Jan. 25, 2016 including the specification, drawings and abstract is incorporated herein by reference in its entirety.

BACKGROUND

1. Technical Field

The present disclosure relates to a transmission case provided in an automatic transmission or the like.

2. Description of Related Art

As described in Japanese Patent Application Publication No. 2002-349667 (JP 2002-349667 A), an automatic transmission to be provided in a vehicle is configured such that a transmission is accommodated inside a transmission case. Further, the transmission case has a through-hole into which a power transmission shaft is inserted, and a peripheral portion around the through-hole is formed as a bearing portion for rotatably support the power transmission shaft. The bearing portion has a shape projecting in a cylindrical shape from a surface (also referred to as a general surface) of the transmission case.

Further, as described in Japanese Patent Application Publication No. 2015-218900 (JP 2015-218900 A), a rib surrounding an outer peripheral side of a sprocket provided in a power transmission mechanism for driving an oil pump or the like is provided on a surface of a transmission case.

SUMMARY

The power transmission shaft is provided with a gear for power transmission. On this account, a radial force or a thrust force to be generated at the time of the power transmission of the gear is transmitted to the bearing portion from the power transmission shaft. As described above, since the bearing portion has a shape projecting in a cylindrical shape from the surface of the transmission case, vibration might occur in the bearing portion due to insufficient rigidity (rigidity to support the power transmission shaft) of the transmission case, thereby resulting in an occurrence of noise.

Conceivable measures to restrain the vibration of the bearing portion are to increase a plate thickness dimension of the transmission case and to add a reinforcement rib. However, these are unfavorable because they cause a large increase in weight of the transmission case.

The present disclosure provides a transmission case that can restrain vibration of a bearing portion without causing a large increase in weight.

A transmission case according to an aspect of the disclosure includes: a wall portion; a bearing portion having a through-hole penetrating through the wall portion such that a power transmission shaft is inserted into the through-hole, the bearing portion projecting from the wall portion in a cylindrical shape; and a rib projected from the wall portion in the same direction as a projection direction of the bearing portion, the rib having an arc portion. When viewed from a direction along the center line of the bearing portion, the wall portion includes i) a first wall portion in a region surrounded by the bearing portion, the arc portion of the rib and two common tangent lines to the bearing portion and the arc portion of the rib, and ii) a second wall portion in another region; and the first wall portion is offset in the projection direction of the bearing portion relative to the second wall portion.

According to the above aspect, rigidity of the transmission case is increased. That is, even in a state where a radial force or a thrust force to be generated at the time of power transmission is transmitted to the bearing portion from the power transmission shaft, vibration of the bearing portion is restrained by the case shape. Further, it is possible to increase the rigidity of the transmission case without increasing a plate thickness dimension of the transmission case, thereby resulting in that the vibration of the bearing portion can be restrained and an occurrence of noise can be restrained without causing a large increase of a weight of the transmission case.

Further, according to the above aspect, the bearing portion is connected to the rib by the wall portion offset in the projection direction of the bearing portion. Hereby, the rigidity of the transmission case is increased. On this account, even in a state where a radial force or a thrust force to be generated at the time of power transmission is transmitted to the bearing portion from the power transmission shaft, vibration of the bearing portion is restrained by the wall portion thus offset. That is, since the wall portion is offset, it is possible to increase the rigidity of the transmission case without increasing the plate thickness dimension of the transmission case, thereby resulting in that the vibration of the bearing portion can be restrained and an occurrence of noise can be restrained without causing a large increase of the weight of the transmission case. Further, a region where the wall portion is offset is a region between two common tangent lines to the bearing portion and the arc portion of the rib, and is set to a minimum region necessary to yield the effect. Accordingly, it is possible to yield the effect while restraining a design change to the minimum.

In the present disclosure, the transmission case including the bearing portion having a cylindrical shape and the rib including the arc portion has a case shape formed by connecting two common tangent lines to the bearing portion and the arc portion of the rib. This accordingly makes it possible to increase the rigidity of the transmission case without increasing the plate thickness dimension of the transmission case, and to restrain vibration of the bearing portion and to restrain an occurrence of noise without causing a large increase of the weight of the transmission case.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the present disclosure is described below with reference to the drawings. The present embodiment deals with a case where the present disclosure is applied to a transmission case for an automatic transmission to be provided in a vehicle.

Figure 1:
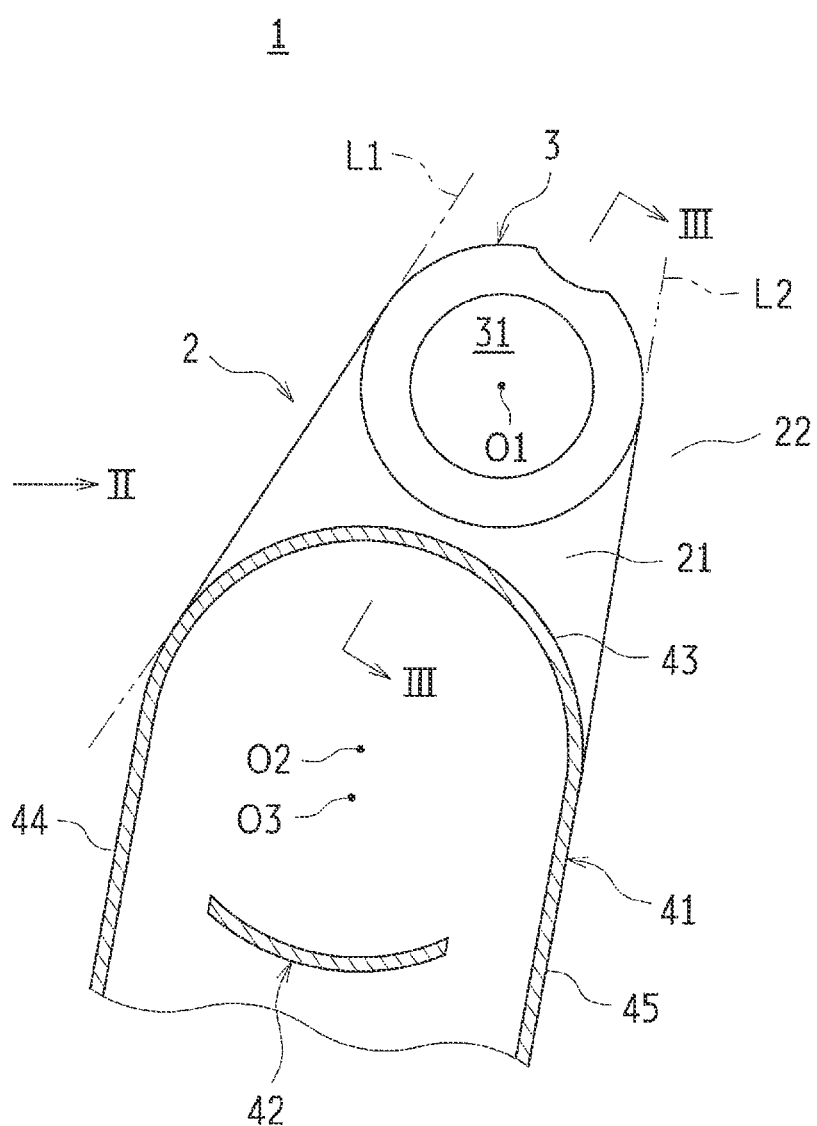
FIG. 1 is a side view illustrating a part of a transmission case.
Figure 2:
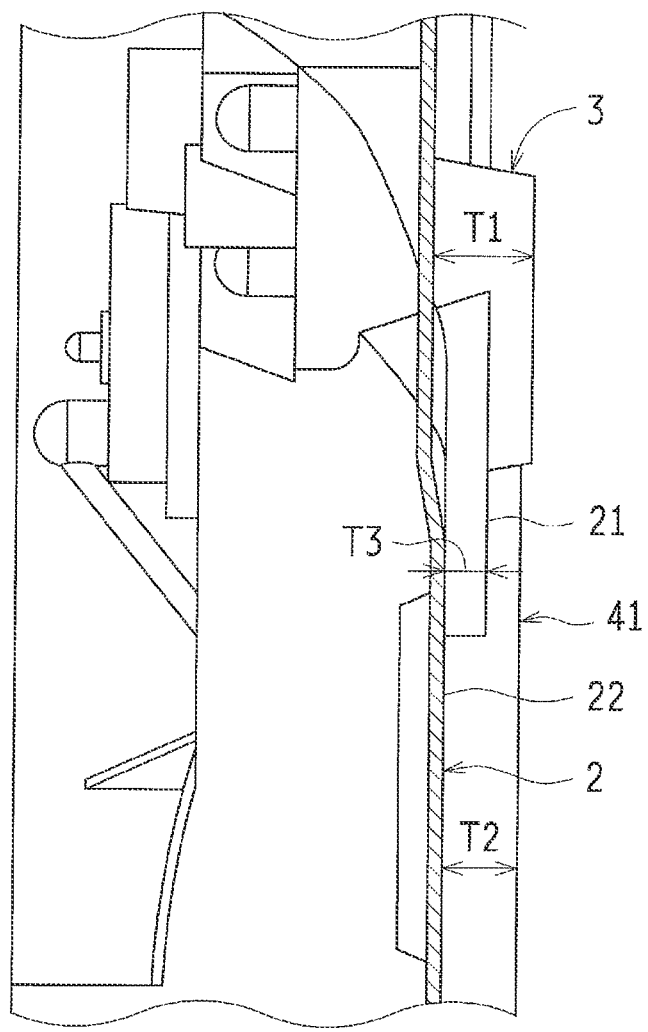
FIG. 2 is a view taken along an arrow II in FIG. 1.
Figure 3:
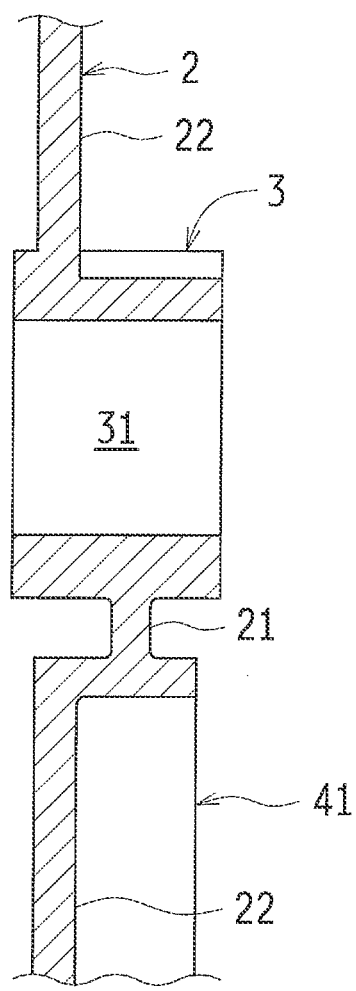
FIG. 3 is a sectional view taken along a line in FIG. 1.

FIG. 1 is a side view illustrating a part of a transmission case 1 according to the present embodiment. Further, FIG. 2 is a view taken along an arrow II in FIG. 1. Further, FIG. 3 is a sectional view taken along a line in FIG. 1. As illustrated in these views, the transmission case 1 includes a wall portion 2, a bearing portion 3, a first rib 41, and a second rib 42.

The wall portion 2 is constituted by a vertical wall extending in a vertical direction in the transmission case 1, and is formed with a plate thickness that allows the transmission case 1 to have a predetermined rigidity.

The bearing portion 3 is formed integrally with the wall portion 2, and has a shape projecting generally in a cylindrical shape from a surface of the wall portion 2. A through-hole 31 into which a power transmission shaft (not shown) is inserted is formed in a center of the bearing portion 3. Thus, the bearing portion 3 has the through-hole 31 penetrating through the wall portion 2 such that the power transmission shaft is inserted therein, and projects from the wall portion 2 in a cylindrical shape. Further, a metal bearing (not shown) is disposed on an inner surface of the through-hole 31, so as to rotatably support the power transmission shaft.

The ribs 41, 42 surround an outer peripheral side of a sprocket provided in a power transmission mechanism for driving an oil pump (not shown). The ribs 41, 42 are projected from the wall portion 2 in the same direction as a projection direction of the bearing portion 3.

The first rib 41 has an arc portion 43 having a center line O2 parallel to a center line O1 of the bearing portion 3. The arc portion 43 surrounds an upper part of the sprocket. Further, chain protection portions 44, 45 extending along a longitudinal direction of a chain (not shown) of the power transmission mechanism are formed consecutively at both ends of the arc portion 43.

The second rib 42 is formed in a circular arc shape having a center line O3 parallel to the center line O1 of the bearing portion 3. The second rib 42 covers a lower part of the sprocket.

Note that the wall portion 2 includes a first wall portion 21 between the bearing portion 3 and the first rib 41, and a second wall portion 22, which is the other region. A feature of the present embodiment is a configuration of the first wall portion 21 between the bearing portion 3 and the first rib 41.

More specifically, as illustrated in FIG. 1, the transmission case is configured to have a shape formed by connecting the bearing portion 3 and the arc portion 43 of the first rib 41 to each other by two common tangent lines L1, L2 (see virtual lines in FIG. 1) to the bearing portion 3 and the arc portion 43 of the first rib 41 when viewed from a direction along the center line O1 of the bearing portion 3. More specifically, the first wall portion 21 in a region surrounded by the bearing portion 3, the arc portion 43 of the rib 41 and two common tangent lines L1, L2 to the bearing portion 3 and the arc portion 43 of the rib 41 is offset in the projection direction (a right direction in FIG. 3) of the bearing portion 3 relative to the second wall portion 22 in the other region.

More specifically, as illustrated in FIG. 2, a projecting dimension of the bearing portion 3 relative to the second wall portion 22 that is not offset is T1 and a projecting dimension of the first rib 41 is T2, whereas an offset dimension of the first wall portion 21 is T3. The projecting dimension T1 of the bearing portion 3 is set to be slightly larger than the projecting dimension T2 of the first rib 41, and the offset dimension T3 of the first wall portion 21 is set to be smaller than the projecting dimension T1 of the bearing portion 3 and the projecting dimension T2 of the first rib 41. More specifically, the offset dimension T3 of the first wall portion 21 is set to about ⅓ of the projecting dimension T1 of the bearing portion 3. Note that these dimensions are not limited to the above, but are set as appropriate.

A transmission cover (not shown) is attached to the transmission case 1 configured as such, in a state where the gear shifter is accommodated therein. In an attachment operation of the transmission cover, an alignment portion formed in an outer peripheral edge of the transmission case 1 and an alignment portion formed in an outer peripheral edge of the transmission cover are put on top of one another, and the alignment portions are fastened to each other by a bolt.

The following describes an effect of the present embodiment. As described above, the first wall portion 21 in the region surrounded by the bearing portion 3, the arc portion 43 of the rib 41 and two common tangent lines L1, L2 to the bearing portion 3 and the arc portion 43 of the rib 41 is offset in the projection direction of the bearing portion 3 relative to the second wall portion 22 in the other region. On this account, the bearing portion 3 is connected to the first rib 41 by the first wall portion 21 offset in the projection direction of the bearing portion 3. Hereby, rigidity of the transmission case 1 is increased. That is, the rigidity of the transmission case 1 is increased by effectively using a rib (the first rib 41) for the sprocket. On this account, even in a state where a radial force or a thrust force to be generated at the time of power transmission is transmitted to the bearing portion 3 from the power transmission shaft, vibration of the bearing portion 3 is restrained by the first wall portion 21 thus offset. That is, since the first wall portion 21 is offset, it is possible to increase the rigidity of the transmission case 1 without increasing a plate thickness dimension of the transmission case 1, thereby resulting in that the vibration of the bearing portion 3 can be restrained and an occurrence of noise can be restrained without causing a large increase in the weight of the transmission case 1.

Further, a region where the wall portion 2 is offset is a region surrounded by the bearing portion 3, the arc portion 43 of the rib 41 and two common tangent lines L1, L2 to the bearing portion 3 and the arc portion 43 of the rib 41, and is set to a minimum region necessary to yield the effect. As a result, it is possible to yield the effect while restraining a design change to the minimum. Thus, according to the configuration of the present embodiment, it is possible to yield the effect with good mass efficiency.

Other Embodiments

The embodiment described above deals with a case where the present disclosure is applied to the transmission case 1 provided in an automatic transmission to be provided in a vehicle. The present disclosure is not limited to this, and the present disclosure is also applicable to a transmission case provided in a transmission to be provided in things other than the vehicle.

Further, the above embodiment deals with a configuration in which the first wall portion 21 is offset between the rib (the first rib 41) for the sprocket and the bearing portion 3. The present disclosure is not limited to this, and the rib is not necessarily the rib for the sprocket, provided that the rib projects from the wall portion 2 in the same direction as the projection direction of the bearing portion 3 and has an arc portion. For example, it is also possible to use a rib disposed so as to surround an outer peripheral side of a gear provided in a power transmission shaft other than the power transmission shaft to be inserted into the through-hole 31. That is, a wall portion in a region between two common tangent lines to an arc portion of the rib and the bearing portion 3 may be offset in the projection direction of the bearing portion 3 relative to a wall portion in the other region.

The present disclosure is applicable to a transmission case including a rib covering a sprocket, and a bearing portion.

What is claimed is:

1. A transmission case comprising:
a wall portion;
a bearing portion having a through-hole penetrating through the wall portion, the through-hole being configured to receive a power transmission shaft, the bearing portion projecting from the wall portion in a cylindrical shape and in a first direction; and
a rib projecting from the wall portion in the first direction, the rib having an arc portion connected to at least one chain protection portion and the arc portion being configured to surround an upper part of a sprocket, wherein:
when viewed from a direction along a center line of the bearing portion, the wall portion includes: (i) a first wall portion located in a first region, the first wall portion having a perimeter defined by the bearing portion, the arc portion of the rib, and two common tangent lines to the bearing portion and the arc portion of the rib, and (ii) a second wall portion located in a second region of the wall portion that is outside of the first region;
the first wall portion is offset in the first direction of the bearing portion relative to the second wall portion; and
the transmission case is shaped such that the bearing portion and the arc portion of the rib are connected by the two common tangent lines of the transmission case.

2. The transmission case according to claim 1, wherein the arc portion of the rib has a center line parallel to the center line of the bearing portion.

3. The transmission case according to claim 1, wherein:
a projecting dimension of the bearing portion relative to the second wall portion is larger than a projecting dimension of the rib relative to the second wall portion; and
an offset dimension of the first wall portion relative to the second wall portion is set to be smaller than the projecting dimension of the bearing portion and the projecting dimension of the rib.

4. The transmission case according to claim 1, wherein the transmission case is shaped such that the bearing portion and the arc portion of the rib are connected at four connection points by the two common tangent lines of the transmission case.

5. A transmission case comprising:
a wall portion;
a bearing portion having a through-hole penetrating through the wall portion, the through-hole being configured to receive a power transmission shaft, the bearing portion projecting from the wall portion in a cylindrical shape and in a first direction; and
a rib projecting from the wall portion in the first direction, the rib having an arc portion, wherein:
when viewed from a direction along a center line of the bearing portion, the wall portion includes: (i) a first wall portion located in a first region, the first wall portion having a perimeter defined by the bearing portion, the arc portion of the rib, and two common tangent lines to the bearing portion and the arc portion of the rib, and (ii) a second wall portion located in a second region of the wall portion that is outside of the first region;
the first wall portion is offset in the first direction of the bearing portion relative to the second wall portion; and
the transmission case is shaped such that the bearing portion and the arc portion of the rib are connected at four connection points by the two common tangent lines of the transmission case.

* * * * *